(12) United States Patent
Wang et al.

(10) Patent No.: US 11,256,872 B2
(45) Date of Patent: Feb. 22, 2022

(54) NATURAL LANGUAGE POLISHING USING VECTOR SPACES HAVING RELATIVE SIMILARITY VECTORS

(71) Applicant: International Business Machines Corporation, Armonk, NY (US)

(72) Inventors: Yuan Yuan Wang, Beijing (CN); ShengYan Sun, BeiJing (CN); Jin Fang Yang, Beijing (CN); Yan Peng Guo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 16/667,066

(22) Filed: Oct. 29, 2019

(65) Prior Publication Data
US 2021/0124802 A1    Apr. 29, 2021

(51) Int. Cl.
*G06F 17/00* (2019.01)
*G06F 40/30* (2020.01)
*G06F 40/242* (2020.01)

(52) U.S. Cl.
CPC ............ *G06F 40/30* (2020.01); *G06F 40/242* (2020.01)

(58) Field of Classification Search
CPC ........ G06F 40/30; G06F 40/242; G06F 40/44; G06F 40/253
See application file for complete search history.

(56) References Cited

U.S. PATENT DOCUMENTS

| 9,037,464 B1 | 5/2015 | Mikolov et al. |
| 9,727,555 B2 | 8/2017 | Korn |
| 10,083,157 B2 | 9/2018 | Strope et al. |

(Continued)

FOREIGN PATENT DOCUMENTS

| CN | 103559176 A | 2/2014 |
| CN | 103559233 A | 2/2014 |

OTHER PUBLICATIONS

Prabhumoye et al., Style Transfer Through Back-Translation, arXiv, 2018, p. 1-13 (Year: 2018).*

(Continued)

*Primary Examiner* — Andrew T McIntosh
(74) *Attorney, Agent, or Firm* — Cantor Colburn LLP; Teddi Maranzano

(57) ABSTRACT

Aspects of the invention include receiving an original work written in a first style to be transformed into a derivate work written in a second style. The transforming includes accessing a similarity data structure organized to include a phrase-similarity vector space of phrase vectors representing degrees of similarity between phrases in a corpus of works written in the second style. An original sentence of the original work that includes one or more original phrases is obtained. The original phrases are located in the phrase-similarity vector space. For each of the original phrases, a similar phrase from the phrase-similarity vector space is selected based on the selected similar phrase having a phrase-similarity index corresponding to the original phrase that is greater than a predetermined phrase-similarity index threshold. The derivative work is created by replacing the original phrases in the original work with the selected similar phrases. The derivative work is output.

17 Claims, 5 Drawing Sheets

(56) References Cited

U.S. PATENT DOCUMENTS

| | | | |
|---|---|---|---|
| 2010/0169078 A1 | 7/2010 | Vanderwold et al. | |
| 2016/0350395 A1* | 12/2016 | Gupta | G06F 40/289 |
| 2019/0050875 A1* | 2/2019 | McCord | G06Q 30/0201 |
| 2021/0092079 A1* | 3/2021 | Mitchell | G06F 40/20 |
| 2021/0150545 A1* | 5/2021 | Wu | G06F 16/9535 |

OTHER PUBLICATIONS

Jansen, S. "Word and Phrase Translation with word2vec", Apr. 24, 2018, Retrieved from arXiv:1705.03127v4 [cs.CL], 11 Pages.

Lai, A. "Writing Like Shakespeare with Machine Learning in Pytorch Creating Recurrent Neural Networks in Pytorch", Towards Data Science, Aug. 7, 2019, Retrieved from https://towardsdatascience.com/writing-like-shakespeare-with-machine-learning-in-pytorch-d77f851d910c.

Mikolov, T. et al., "Efficient Estimation of Word Representations in Vector Space", Sep. 7, 2019, v3, Retrieved from https://arxiv.org/pdf/1301.3781, 12 Pages.

\* cited by examiner

NATURAL LANGUAGE POLISHING USING VECTOR SPACES HAVING RELATIVE SIMILARITY VECTORS

BACKGROUND

The present invention relates to style transformation of original works, and more specifically, to using relative similarity vectors for transforming original works into derivative works.

SUMMARY

Embodiments of the present invention are directed to methods, systems, computer program products, and circuitry. A non-limiting example method includes receiving, by a processor, an original work written in a first style. The method includes transforming, by the processor, the original work into a derivate work written in a second style, the original work and the derivative work written in a same natural language. The transforming includes accessing, a similarity data structure organized to include a phrase-similarity vector space of phrase vectors representing degrees of similarity between phrases in a corpus of works written in the second style. The transforming also includes obtaining an original sentence of the original work, the original sentence including one or more original phrases. The transforming also includes locating each of the one or more original phrases in the phrase-similarity vector space. The transforming further includes selecting, for each of the one or more original phrases, a similar phrase from the phrase-similarity vector space based at least in part on the selected similar phrase having a phrase-similarity index corresponding to the original phrase that is greater than a predetermined phrase-similarity index threshold. The transforming further includes creating the derivative work, the creating comprising replacing the original phrases in the original work with the selected similar phrases. The method includes outputting the derivative work.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Although the proliferation of content has occurred in recent years, this content may lack the well-accepted styles and features appreciated by critics and readers. One or more embodiments of the present invention provide style transformation of original works using relative similarity vectors. One or more embodiments of the present invention provide a translation program that is operable upon execution to output a derivative work based on an original work according to a corpus that reflects a style of one or more specific authors and/or a specific time period.

It should be appreciated that the terms original, derivative, works, and the like are not intended to invoke a legal meaning with regard to copywritten materials and are instead intended to imply a lay understanding of the terms as first works, second works, and the like. Works may be any form of communication, including writing, symbols, or disclosure. Contemporary methods do not provide style transformations of works to reflect a particular style as disclosed herein. Issues include an inability to adequately perform style transfer from an original work to a derivative work without significant change to the original content or original meaning. One or more embodiments disclosed herein address these issues by comparing the similarity of the original text to available styles within the metes and bounds of a defined corpus. As such, styles from an original work may be transformed into a particular style in a derivative work. Further, the use of one data structure for similarity analysis, as described herein, is not known. A self-referential data structure that provides style transformation from a known corpus is new and improves the storage and look-up times associated with two or more data structures or partitions.

Figure 1:
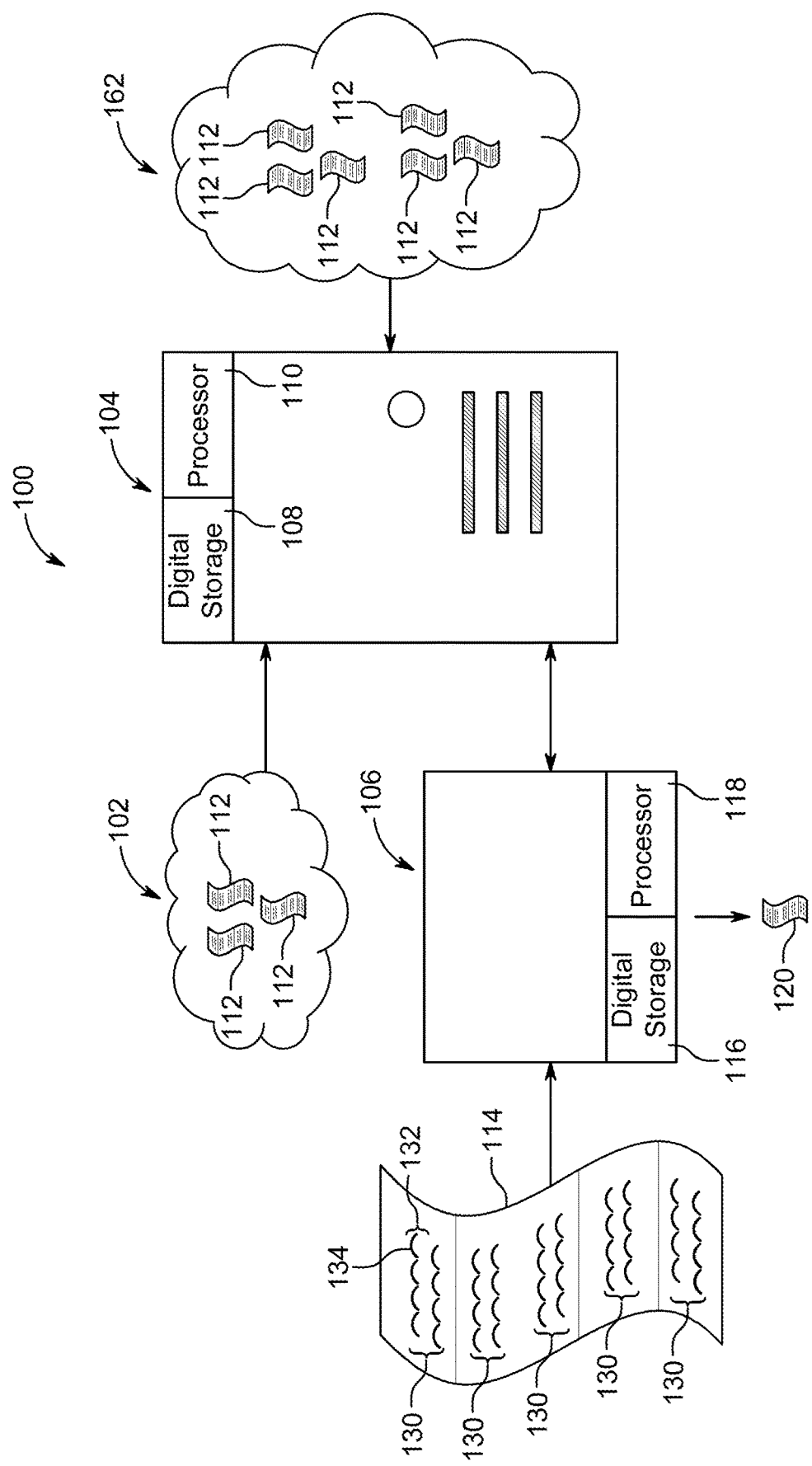
FIG. 1 illustrates a system diagram for a natural language processing of original and derivative works in accordance with one or more embodiments of the present invention.

Turing now to FIG. 1, a system 100 for natural language processing of original and derivative works is generally shown in accordance with one or more embodiments of the present invention. The system 100 may include any number of servers 104 and endpoints 106 in accordance with one or more embodiments of the present invention. The servers 104 may be collectively disposed and interconnected to improve resource capacities and capabilities. As an example, the servers 104 may be a server cluster or mainframe architecture. The endpoint 106 may be one of the servers 104, disposed on the same hardware environment, virtual environment or otherwise. The endpoint 106 may be a mobile device or platform networked with the server 104. The server 104 includes resources. The endpoint 106 may include resources. The resources may include digital storage 108, 116 and processors 110, 118. As stated above, the digital storage 108, 116 and processors 110, 118 may be of any number, physical or virtual, shared or independent. The digital storage 108, 116 and processors 110, 118 may include any combination of processors 110, field programmable gate arrays (FPGAs), or application specific integrated circuits (ASICs). The processor may include memory, having volatile and non-volatile portions, operable to store machine instructions as a translation program from the processors 110 and other processing mechanisms to perform aspects of this disclosure, as necessary. The translation program that performs at least a subset of the transforming from an original work to a derivative work described herein may be stored (e.g., stored instructions, stored machine instructions, stored steps) in any language or representation. It should be appreciated that any type of wired or wireless configuration is appreciated for any of the communications from the controller. Wireless protocols such as ZIGBEE, WI-FI, BLUETOOTH, or any other implement may be used. Communications may be realized through any protocol or medium.

The server 104 may be configured to receive a corpus 102 of works 112 and a comprehensive compilation 162 of works 112. The corpus 102 may include works 112 from a single writer or from a group of writers having similar styles. The works 112 may be written in a natural language (e.g., Mandarin, English). As such, the comprehensive compilation 162 includes more works 112 than the corpus 102 in the same language. The server 104, which may include or cooperate with endpoint 106 receives the works 112 and processes similarities therein. The endpoint 106 receives an original work 114. The endpoint 106 outputs a derivative work 120. The original work 114, the works 112 of the corpus 102, or the derivative work 120 include sentences 130. The sentences 130 may be defined by periods and spacing. The sentences 130 include phrases 132. The phrases 132 includes words 134. The original work 114 may include original sentences 130, original phrases 132, and original words 134. The works 112 of the corpus 102 similarly include corpus words, corpus phrases, and corpus sentences. The derivative work 120 similarly includes derivative sentences, derivative phrases, and derivative words.

Figure 2A:
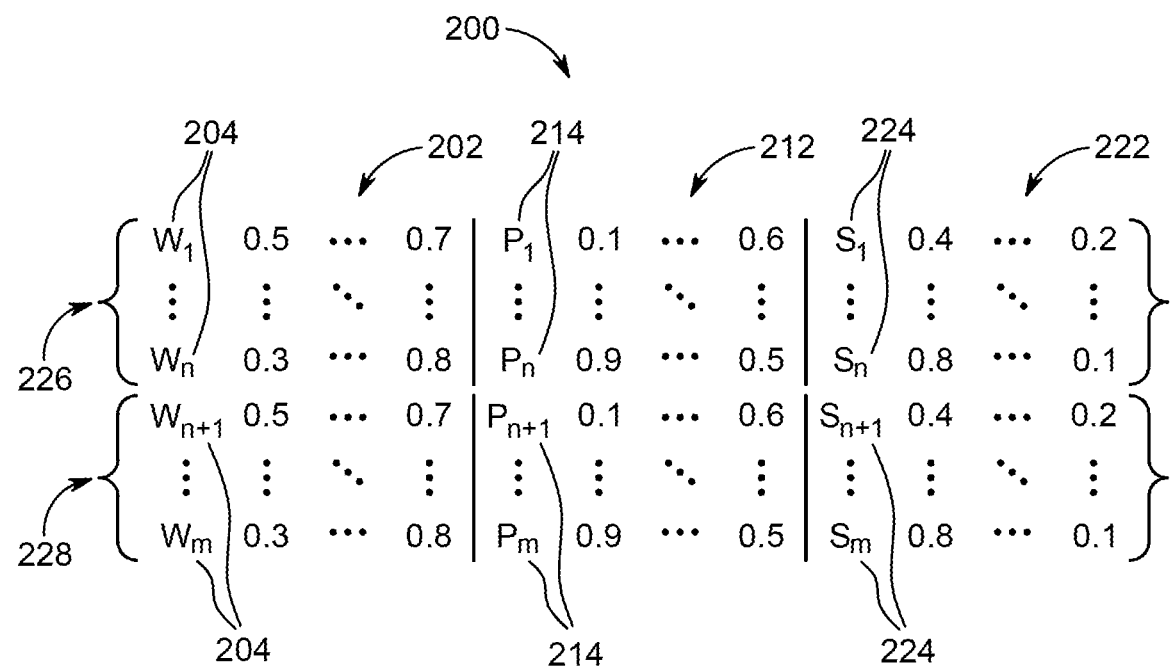
FIG. 2A illustrates a similarity data structure in accordance with one or more embodiments of the present invention.

Referring to FIG. 2A, similarity data structure 200 is shown in accordance with one or more embodiments of the present invention. The similarity data structure 200 includes a word-similarity vector space 202, a phrase-similarity vector space 212, and a sentence-similarity vector space 222. Although shown as word, phrase, and sentence similarity spaces, similarity may be processed based on any number of delimiters.

Similarity may be defined by any known application. One application may include calculating the cosine of the two vectors to estimate their similarity. The cosine, or other, similarity may define the word-similarity indices, phrase-similarity indices, and sentence-similarity indices. Because cosine values may range from [−1, 1], the closer cosine is to a positive one, the closer the directions of the two vectors. The closer the cosine is to a negative one, the more disparate the directions of the two vectors. Therefore, similarity may be based on the closeness to positive one of the cosine of the two vectors. Other applications used to define similarity of vectors may include Tanimoto Similarity, Euclidean Distance, Manhattan Distance, etc. Cosine similarity may be defined according Equation 1 below.

$$\cos\theta = \frac{\Sigma_1^n(Ai*Bi)}{\left(\sqrt{\Sigma_1^n A_i^2} * \sqrt{\Sigma_1^n B_i^2}\right)} \quad (1)$$

As for words, spaces may be used to identify words. Other delimiters may also be used, including characters (e.g., similar characters). The word-similarity vector space 202 includes word vectors 204. The word vectors 204 correspond to words $W_1$-$W_n$. As an example, $W_1$ may be "cat".

The similarity between word vectors 204 may be expressed as probabilities, or weights, indicating the relative similarity with other words in the word-similarity vector space 202. As an example, $W_2$ may be "dog". Similarity between "cat" and "dog" may be 0.50 while similarity between "cat" and "cow" may be 0.25. Similarity between words may be defined by the distance between surrounding words, proximity indicating increased similarity. As such, a word-similarity vector space 202 is formed based on the works 112 in the corpus 102 that are unique to the single writer or group of writers as a first partition 226 containing word vectors 204 from the corpus 102 and works 112 in the comprehensive compilation 162 as a second partition 228 containing word vectors 204 from the comprehensive compilation 162.

As for phrases or other sentence portions, grammatical and syntactical keys may identify the beginning and end of phrases. The phrase-similarity vector space 212 includes phrase vectors 214. The phrase vectors 214 correspond to phrases $P_1$-$P_n$. As an example, $P_1$ may be "the cat jumps". The similarity between phrase vectors 214 may be expressed as probabilities, or weights, indicating the relative similarity with other phrases in the phrase-similarity vector space 212. As an example, $P_2$ may be "the dog sits". Similarity between "the cat jumps" and "the dog sits" may be 0.25 while similarity between "the cat jumps" and "the dog jumps" may be 0.35. Similarity between phrases may be defined by the distance between surrounding phrases, proximity indicating increased similarity. As such, a phrase-similarity vector space 212 is formed based on the works 112 in the corpus 102 that is unique to the single writer or group of writers as a first partition 226 containing phrase vectors 214 from the corpus 102 and works 112 in the comprehensive compilation 162 as a second partition 228 containing phrase vectors 214 from the comprehensive compilation 162. Additionally, the phrase-similarity vector space 212 may be based on the word-similarity vector space 202. That is, the phrase-similarity vector space 212 may include similarity probabilities that include replacement of the words in the phrases with words from the word-similarity vector space 202 and relative similarities thereof.

As for sentences, periods may identify the beginning and end of the sentences. It should be appreciated that sentences may include one or more phrases (each phrase having one or more words), paragraphs, pages, or other sections of text (e.g., footnotes, headings, citations.) The sentence-similarity vector space 222 includes sentence vectors 224. The sentence vectors 224 correspond to sentences $S_1$-$S_n$. As an example, $S_1$ may be "the cat jumps over the table." The similarity between sentence vectors 224 may be expressed as probabilities, or weights, indicating the relative similarity with other sentences in the sentence-similarity vector space 222. As an example, $S_2$ may be "the dog sits on the floor." Similarity between "the cat jumps on the table" and "the dog sits on the floor" may be 0.15 while similarity between "the cat jumps on the table" and "the dog jumps on the table" may be 0.30. Similarity between sentences may be defined by the distance between surrounding sentences, proximity indicating increased similarity. As such, a sentence-similarity vector space 222 is formed based on the works 112 in the corpus 102 that is unique to the single writer or group of writers as a first partition 226 containing sentence vectors 224 from the corpus 102 and works 112 in the comprehensive compilation 162 as a second partition 228 containing sentence vectors 224 from the comprehensive compilation 162. Additionally, the sentence-similarity vector space 222 may be based on the phrase-similarity vector space 212 and the word-similarity vector space 202. That is, the sentence-similarity vector space 222 may include similarity probabilities that include replacement of the phrases in the sentence with phrases from the phrase-similarity vector space 212 and words in the phrases with words from the word-similarity vector space 202.

The translation program may be operable upon execution to remove duplicates in the first partition 226 and the second partition 228 to prevent matches to the exact same word vectors 204, phrase vectors 214, and sentence vectors 224.

Figure 2B:
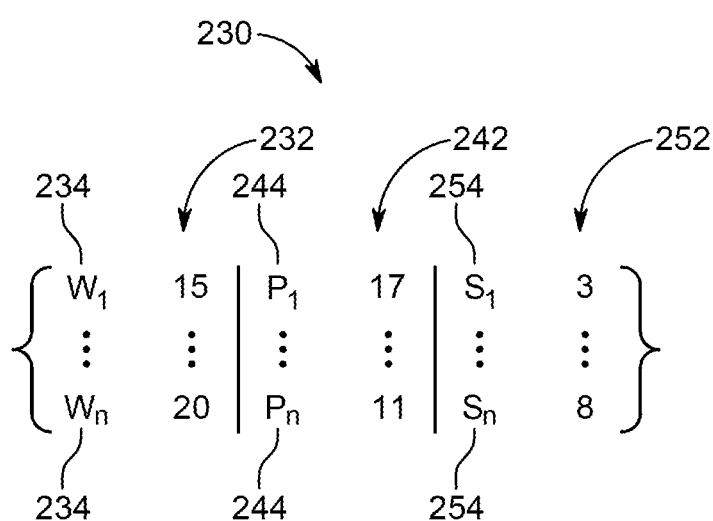
FIG. 2B illustrates a count data structure in accordance with one or more embodiments of the present invention.

Turning now to FIG. 2B, a count data structure 230 is shown in accordance with one or more embodiments of the present invention. The count data structure 230 includes counts associated with the word vectors 204, phrase vectors 214, and sentence vectors 224. Distinct word vectors 204, phrase vectors 214, and sentence vectors 224 are counted as word counts 234, phrase-counts 244, and sentence-counts 254, respectively, for common use in a word-count dictionary 232, phrase-count dictionary 242, and sentence-count dictionary 252. The more often that a single author or group of authors uses the given word, phrase, or sentence, the more likely the word, phrase, or sentence will be replaced. In this way, the count data structure 230 may be considered a collection of words, phrases, and sentences of the author that characterizes the author's style.

Figure 3:
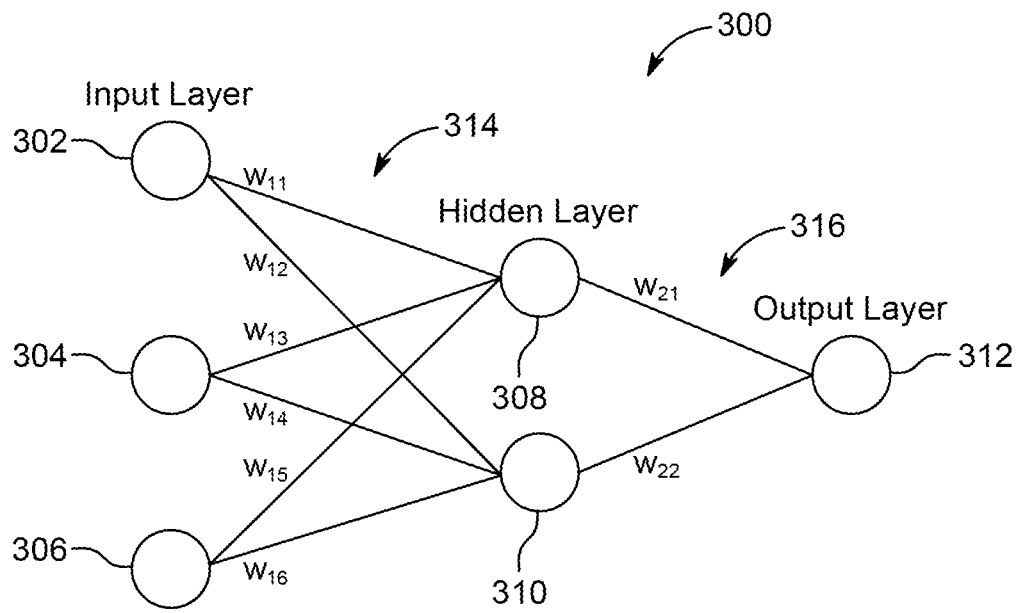
FIG. 3 illustrates a neural network associated with generating associations between inputs and outputs in accordance with one or more embodiments of the present invention.

Continuing with FIG. 3, a neural network 300 associated with generating the similarity data structure 200 and the count data structure 230 and other inputs and outputs is shown in accordance with one or more embodiments of the present disclosure. As such, the weights 314, 316 define the similarity data structure 200 and the word vectors 204, phrase vectors 214, and sentence vectors 224 therein. The weights 314, 316 may also similarly, separately, or unitarily define the count data structure 230. Those versed in the art will readily appreciate that such embodiments or portions thereof do not bind the invention to any number of neural networks 300 and associated weights 314, 316 or matrices. Various neural networks 300 may be combined or organized to simultaneously define the weights 314, 316 as an encoder configured to encode and decode the inputs 302, 304, 306 of the input layer to the outputs 312 of the output layer. Those versed in the art will appreciate that the weights 314, 316 may be trained such that the similarity data structure 200 and the count data structure 230 are defined by forward and backward propagation to reduce loss associated with neural network 300.

One or more hidden layers with hidden layers nodes 308, 310 may be used to define additional activation functions or computations. As such, the neural network 300 is used to define the weights 314, 316 that may correspond to the similarity data structure 200 and the count data structure 230. The similarity data structure 200 may be based on relative distances between words and other words. As an example, the word vectors 204, phrase vectors 214, and sentence vectors 224 may correspond to the likelihood of being found near one another such that each entry corresponds percent likelihoods of corresponding word vectors 204, phrase vectors 214, and sentence vectors 224. The weights 314, 316 may also be used for selection of the words, phrases, or sentences as output 312. That is, given an original word 134, original phrase 132, or original sentence 130, the neural network 300 may be configured to present a corresponding word, phrase, or sentence at output 312 based on the similarity data structure 200, the count data structure 230, or a combination thereof to define the derivative work 120. As such, the neural network 300 is operable upon execution by a processor to select similar words, similar phrases, and similar sentences from an original work 114 based on a comparison with respective sentence-similarity index thresholds, phrase-similarity index thresholds, and word-similarity index thresholds.

In accordance with one more embodiments of the present invention, the sentence-similarity index thresholds, phrase-similarity index thresholds, and word-similarity index thresholds may have corresponding similarity indices. As an example, the word-similarity index threshold may be 0.7, the phrase-similarity index threshold may be 0.65, and the sentence-similarity index threshold may be 0.5. The greatest word similarity between the original word 134 and a word in the word-similarity vector space 202 (designating an associated word vector 204) may be 0.785. The greatest phrase similarity between the original phrase 132 and a phrase in the phrase-similarity vector space 212 (designating an associated phrase vector 214) may be 0.624. The greatest sentence similarity between the original sentence 130 and a sentence in the sentence-similarity vector space 222 (designating an associated sentence vector 224) may be 0.569. In this example, the associated sentence vector 224 having the greatest sentence similarity of 0.569 may be used to define the corresponding sentence of the derivative work 120 based on the difference between the respective index thresholds and the respective similarities. In this example, the word-similarity index difference is 0.785−0.7=0.085. In this example, the phrase-similarity index difference is 0.624−0.65=−0.026. In this example, the sentence-similarity index difference is 0.569−0.5=0.069. As such, only the associated word vector 204 and sentence vector 224 may be used in the derivative work 120 and the sentence vector 224 or phrase vector 214 may be given priority over the word vector 204 in replacing portions of the original work 114 when the associated word vector 204 and sentence vector 224 meet the threshold.

If more than one word vector 204, phrase vector 214, or sentence vector 224 is greater than the corresponding thresholds, the translation program may be operable upon execution to average the respective word-similarity indices, phrase-similarity indices, and sentence-similarity indices that are greater than the respective thresholds. As such, the derivative work 120 may include all of the similar words, by replacing the original words with the similar words, having similarities above the word-similarity index threshold in response to the average difference defined with respect to the word-similarity index threshold is greater than the phrase-similarity indices average difference defined with respect to the phrase-similarity index threshold. The derivative work 120 may include all of the similar phrases having similarities above the phrase-similarity index threshold in response to the average difference defined with respect to the phrase-similarity index threshold is greater than the sentence-similarity indices average difference defined with respect to the sentence-similarity index threshold. The derivative work 120 may include all of the similar sentences having similarities above the sentence-similarity index threshold. Although averages may be used, other statistical values may be used, including but not limited to medians and standard deviations.

Figure 4:
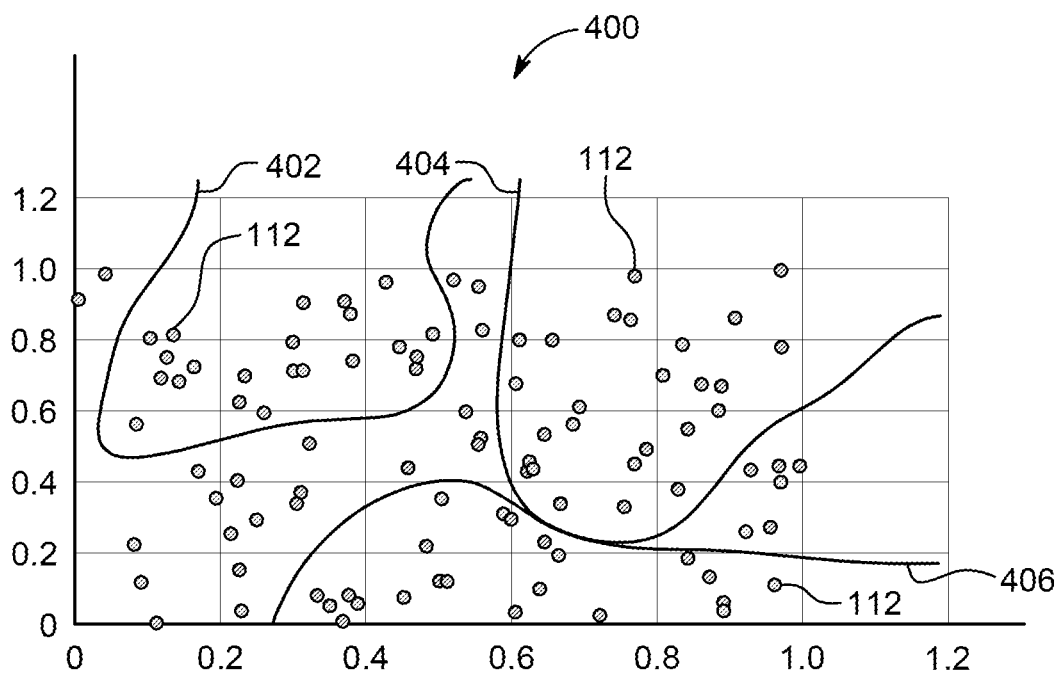
FIG. 4 illustrates clustering of associated original works in accordance with one or more embodiments of the present invention.

Turning to FIG. 4, a graph 400 including clusters 402, 404, 406 of original works 112 is shown in accordance with one or more embodiments of the present invention. An unsupervised machine learning model and clustering may be used to define the clusters 402, 404, 406. The unsupervised clustering defines statistical similarities between the original works 112. Such statistical similarities may allow grouping of similar works 112 to define the corpus 102. That is, the corpus 102 may be defined by the group of original works 112 within a defined cluster 402, 404, 406. Those versed in the art will readily appreciate that any type of clustering algorithm may be used. As an example, k-means or highly-connected subgraphs algorithm. The works 112 may be aggregated from a larger corpus 102 according to authorship. The works 112 may be aggregated by the translation program by geographical region and time period. Supervised learning may be used to specify geographical region and time period.

Figure 5:
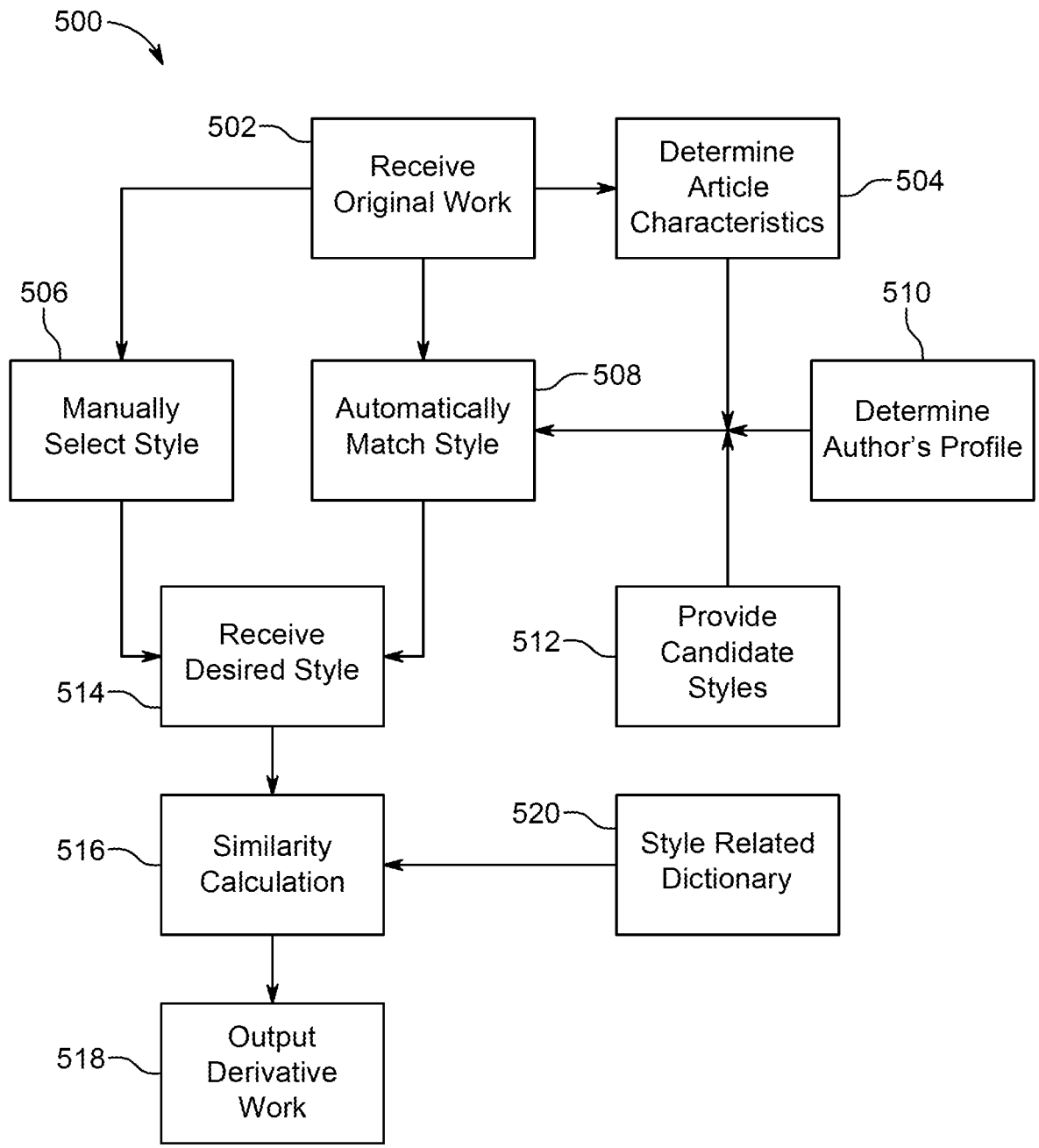
FIG. 5 illustrates a process for altering the style of an original work in accordance with one or more embodiments of the present invention.

Referring to FIG. 5, a process 500 associated with altering the style of an original work and for implementing portions of this disclosure in accordance with one or more embodiments of the present invention is shown. The process 500 begins in block 502 where the original work 114 is received. The original work 114 may be inspected using one of the neural networks 300 described above. The characteristics of the original work 114 may be determined as data points or define the original work 114 within a cluster 402, 404, 406. Further, in block 510 information related to the author's style of the original work 114 may be used to determine the, along with candidate styles 512 and automatically match the original work's styles in block 508. Additionally, styles may be manually selected in block 506. That is, a computer readable medium may be operable upon execution by a processor to enable a user to select a style or one of the clusters 402, 404, 406. In block 514, the desired style is received as a corpus 102 to define the similarity data structure 200 and the count data structure 230. In block 516, the neural network 300 with defined weights 314, 316 can be used in combination with the similarity data structure 200 and the count data structure 230. In block 518, the derivative work 120 is outputted. Output may include a text file or a file of another format. The derivative work 120 may be display on a user interface. As an example, a computer readable medium may be operable upon execution by a processor to generate a user interface display that depicts the derivative work 120. The derivative work 120 may include a reference link to the original works 114 or the works 112 from the corpus 102. As such, a user interface displaying the derivative work 120 is operable upon execution by the user to navigate to the original work 114 or works 112 of the corpus 102.

Figure 6:
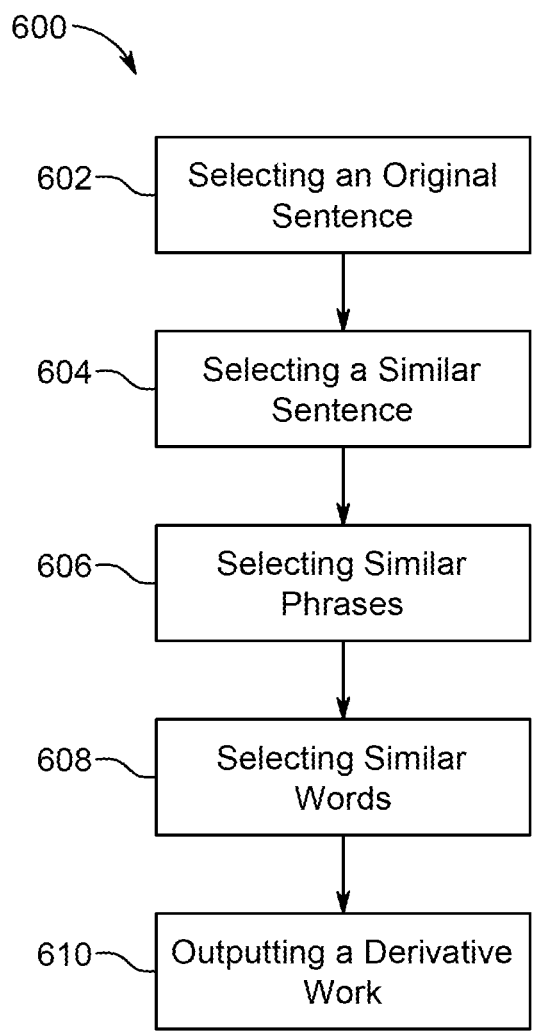
FIG. 6 illustrates a process for altering the style of an original work in accordance with one or more embodiments of the present invention.

Turning now to FIG. 6, a process 600 for altering the style of an original work and for implementing portions of this disclosure in accordance with one or more embodiments of the present invention is shown. The process 600 includes block 602 for selecting an original sentence 130 of an original work 114. It should be appreciated that more or less than one sentence may be selected as sentences, words, or phrases. The selection may be performed by a processor configured to select a memory location containing stored strings or other digital data. The memory location may be remote from the processor, associated with the processor, or over a network. The selection may include copying the original sentence 130 from a system memory location to a memory cache associated with the processor.

In block 604, a similar sentence is selected. The similarity of the sentence may be based on sentence-similarity indices defined by the sentence vector 224. The original sentence 130 is used for a character-wise, or other-wise, search through one or both of the first partition 226 and the second partition 228 of the sentence-similarity vector space 222, if a character-wise match is found, the associated sentence vector 224 is compared to all of the first partition 226 sentence vectors 224. The comparison may be performed using the similarity determine methods discussed above to define the sentence-similarity indices. The sentence-similarity indices may be a percentage of similarity defined by the machine learning results defined in FIGS. 2A, 2B, and 3. As suggested above, the sentence-similarity index may be 0.785. That is, the similarity of the original sentence 130 of the original work 114 has a greatest similar sentence vector 224 in the sentence-similarity vector space 222 with calculated to be 0.785 by the neural network 300 at output 312.

In block 606, a similar phrase is selected. The similarity of the phrase may be based on phrase-similarity indices defined by the phrase vector 214. The original phrase 132 is used for a character-wise, or other-wise, search through one or both of the first partition 226 and the second partition 228 of the phrase-similarity vector space 212, if a character-wise match is found, the associated phrase vector 214 is compared to all of the first partition 226 sentence vectors 214. The comparison may be performed using the similarity determine methods discussed above to define the phrase-similarity indices. The phrase-similarity indices may be a percentage of similarity define by a machine learning results defined in FIGS. 2A, 2B, and 3. As suggested above, the phrase-similarity index may be 0.624. That is, the similarity of the original phrase 132 of the original work 114 has a greatest similar phrase vector 214 in the phrase-similarity vector space 212 with calculated to be 0.624 by the neural network 300 at output 312.

In block 608, a similar word is selected. The similarity of the word may be based on word-similarity indices defined by the word vector 204. The original word 134 is used for a character-wise, or other-wise, search through one or both of the first partition 226 and the second partition 228 of the word-similarity vector space 202, if a character-wise match is found, the associated phrase vector 204 is compared to all of the first partition 226 sentence vectors 204. The comparison may be performed using the similarity determine methods discussed above to define the word-similarity indices. The word-similarity indices may be a percentage of similarity define by a machine learning results defined in FIGS. 2A, 2B, and 3. As suggested above, the word-similarity index may be 0.569. That is, the similarity of the original word 134 of the original work 114 has a greatest similar word vector 204 in the word-similarity vector space 202 with calculated to be 0.569 by the neural network 300 at output 312.

As suggested, any number of sentences, phrases, and words may be selected by the neural network 300 having a similarity index above the respective similarity threshold, and the derivative work 120 may include any of those sentences, phrases, and words.

In block 610, the derivative work 120 is outputted. The output may be in any medium, including but not limited to files, user interfaces, and network communications. The derivative work 120 is based on the original work 114 and alter according to the selected corpus 102. The alternation of the original work 114 may include different words, phrases, or sentences with similar meanings.

The count data structure 230 may be used to prevent changes to the original work 114 unless the similar word, phrase, or sentence appears in the corpus 102 often. As an example, the use of a very similar word one time in the corpus 102 may consistently define the output, even though works 112 in the corpus 102 rarely use the word. To improve the derivative work 120, a threshold number of occurrences may be required before the similar word, phrase, or sentence is replaced. Correlation between the number of counts of the count data structure 230 may be defined with respect to the similarity such that higher similarities require less counts. The translation program may be operable upon execution by the processor to select the similar sentence vector 224 from the sentence-similarity vector space 222 according to the similar sentence being defined in a sentence-count dictionary 252. The translation program may be operable upon execution by the processor to select the similar phrase vector 214 from the phrase-similarity vector space 212 is according to the similar phrase vector 214 being defined in a phrase-count dictionary 242. The translation program may be operable upon execution by the processor to select the similar word vector 204 from the word-similarity vector space 202 is according to the similar word vector 204 being defined in a word-count dictionary 232.

It should be appreciated that the translation program or method may be implemented to search for original words in the similarity data structure 200 associated with the corpus 102 in partition 226. As such, the translation program may only need the word-similarity vector space 202 associated with the corpus 102 and the comprehensive partition 228 may be omitted. In accordance with one or more embodiment of the present invention, the first partition 226 may be disposed on the endpoint 106 and the second partition 228 may be disposed on the server 104. As such, the translation program or method may be configured to first lookup the original words, original phrases, and original sentences of the original work 114 on the first partition 226. If any of the original words, original phrases, and original sentences are not found, the translation program or method may request a lookup from the second partition 228 from the server 104. It should also be appreciated that one or both of the partitions 226, 228 may be located on the endpoint 106 and one or both of the partitions 226, 228 may be located on the server 104. Offboarding the partitions 226, 228 may decrease the onboard memory necessary for the endpoint 106. Onboarding the partitions 226, 228 may increase the search and seek time for the endpoint 106. As such, the first partition 226 may be disposed on the endpoint 106 and the second partition 228 may be disposed on the server 104 in accordance with one or more embodiment of the present invention.

The foregoing description is just an example of one or more embodiments of the invention, and variations and substitutions are contemplated to the extent necessary. The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process blocks described herein can be incorporated into a more comprehensive procedure or process having additional blocks or functionality not described in detail herein. By utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The instructions disclosed herein, which may execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising
receiving, by a processor, an original work written in a first style;
transforming, by the processor, the original work into a derivate work written in a second style, the original work and the derivative work written in a same natural language, the transforming comprising:
accessing, a similarity data structure organized to include a phrase-similarity vector space of phrase vectors representing degrees of similarity between phrases in a corpus of works written in the second style, wherein each phrase comprises two or more words;
accessing a count data structure organized to include a phrase-count dictionary including a phrase-count of the corpus phrases in the corpus having phrase-counts greater than a phrase-count threshold;
obtaining an original sentence of the original work, the original sentence comprising one or more original phrases;
locating each of the one or more original phrases in the phrase-similarity vector space;
selecting, for each of the one or more original phrases, a similar phrase from the phrase-similarity vector space based at least in part on the selected similar phrase having a phrase-similarity index corresponding to the original phrase that is greater than a predetermined phrase-similarity index threshold and on the selected similar phrase being included in the phrase-count dictionary;
creating the derivative work, the creating comprising replacing the one or more original phrases in the original work with the selected similar phrases; and
outputting the derivative work.

2. The method of claim 1, further comprising generating the phrase-count dictionary.

3. The method of claim 1, wherein the transforming is performed for all of the original sentences in the original work prior to outputting the derivative work.

4. The method of claim 1, wherein the original phrase consists of a single word.

5. The method of claim 1, wherein the original sentence consists of a single phrase.

6. The method of claim 1, wherein the locating each of the one or more original phrases in the phrase-similarity vector space includes a character-wise lookup of the original phrases in the phrase-similarity vector space.

7. The method of claim 6, wherein the phrase-similarity vector space is defined by a corpus comprising works having the second style.

8. The method of claim 7, wherein the corpus further comprises works having an additional style that is different than the first style and the second style.

9. A system comprising:
one or more processors for executing computer readable instructions, the computer readable instructions controlling the one or more processors to perform operations comprising:
accessing, a similarity data structure organized to include a phrase-similarity vector space of phrase vectors representing degrees of similarity between phrases in a corpus of works written in the second style, wherein each phrase comprises two or more words;
accessing a count data structure organized to include a phrase-count dictionary including a phrase-count of the corpus phrases in the corpus having phrase-counts greater than a phrase-count threshold;
obtaining an original sentence of the original work, the original sentence comprising one or more original phrases;
locating each of the one or more original phrases in the phrase-similarity vector space;
selecting, for each of the one or more original phrases, a similar phrase from the phrase-similarity vector space based at least in part on the selected similar phrase having a phrase-similarity index corresponding to the original phrase that is greater than a predetermined phrase-similarity index threshold and on the selected similar phrase being included in the phrase-count dictionary;
creating the derivative work, the creating comprising replacing the one or more original phrases in the original work with the selected similar phrases; and
outputting the derivative work.

10. The system of claim 9, further comprising generating the phrase-count dictionary.

11. The system of claim 9, wherein the transforming is performed for all of the original sentences in the original work prior to outputting the derivative work.

12. The system of claim 9, wherein the original phrase consists of a single word.

13. The system of claim 9, wherein the original sentence consists of a single phrase.

14. The system of claim 9, wherein the locating each of the one or more original phrases in the phrase-similarity vector space includes a character-wise lookup of the original phrases in the phrase-similarity vector space.

15. The system of claim 14, wherein the phrase-similarity vector space is defined by a corpus comprising works having the second style.

16. The system of claim 15, wherein the corpus further comprises works having an additional style that is different than the first style and the second style.

17. A computer program product comprising a computer readable storage medium having program instructions embodied therewith, the program instructions executable by a processor to cause the processor to perform operations comprising:
accessing, a similarity data structure organized to include a phrase-similarity vector space of phrase vectors representing degrees of similarity between phrases in a corpus of works written in the second style, wherein each phrase comprises two or more words;
accessing a count data structure organized to include a phrase-count dictionary including a phrase-count of the corpus phrases in the corpus having phrase-counts greater than a phrase-count threshold;
obtaining an original sentence of the original work, the original sentence comprising one or more original phrases;

locating each of the one or more original phrases in the phrase-similarity vector space;

selecting, for each of the one or more original phrases, a similar phrase from the phrase-similarity vector space based at least in part on the selected similar phrase having a phrase-similarity index corresponding to the original phrase that is greater than a predetermined phrase-similarity index threshold and on the selected similar phrase being included in the phrase-count dictionary;

creating the derivative work, the creating comprising replacing the one or more original phrases in the original work with the selected similar phrases; and outputting the derivative work.

\* \* \* \* \*